Figure 1:
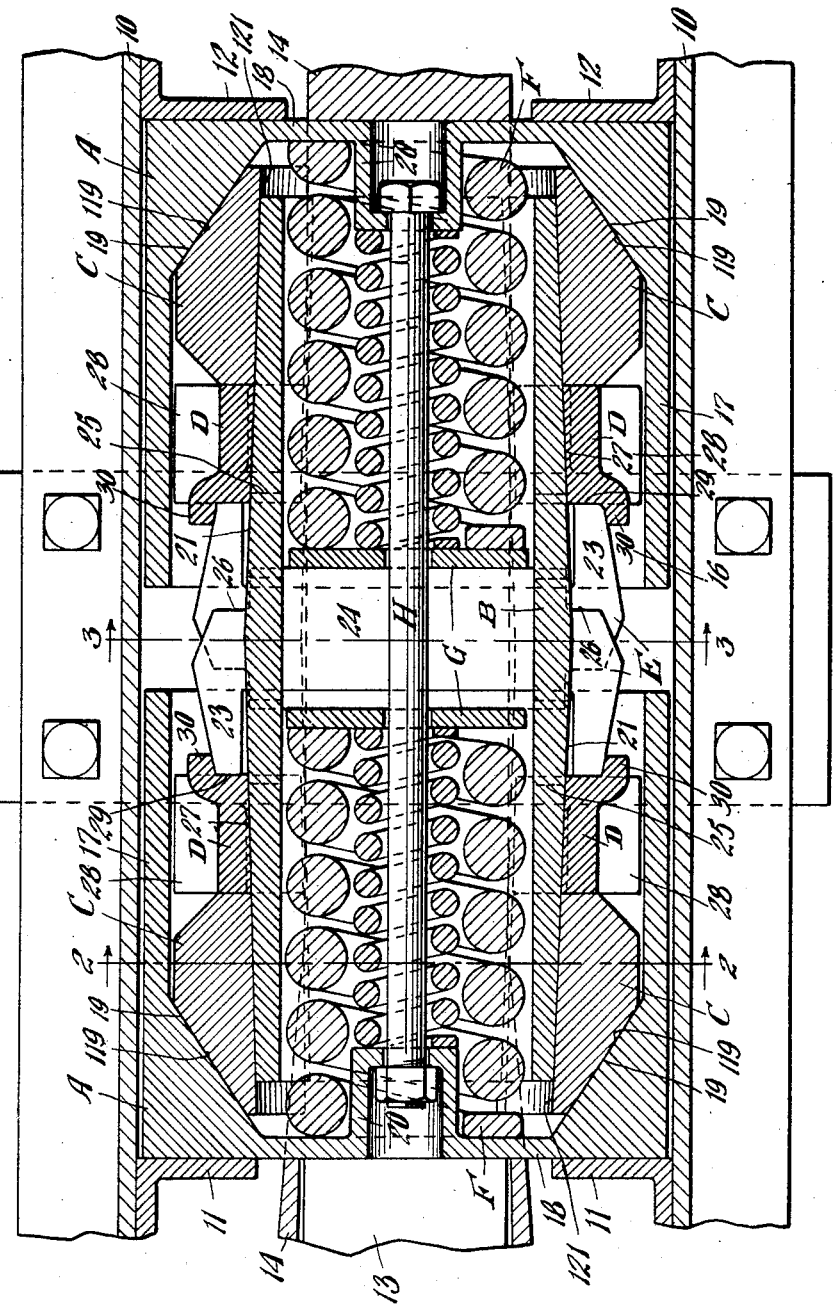

June 12, 1928.　　　　　　　　　　　　　　　1,673,371
J. F. O'CONNOR
FRICTION SHOCK ABSORBING MECHANISM
Original Filed Jan. 2, 1925　　2 Sheets-Sheet 1

Witnesses
Wm. Geiger

Inventor
John F. O'Connor
By George D. Haight
His Atty.

June 12, 1928. 1,673,371
J. F. O'CONNOR
FRICTION SHOCK ABSORBING MECHANISM
Original Filed Jan. 2, 1925 2 Sheets-Sheet 2
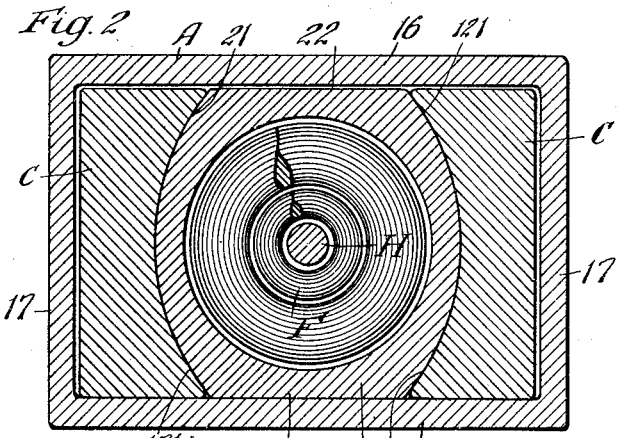
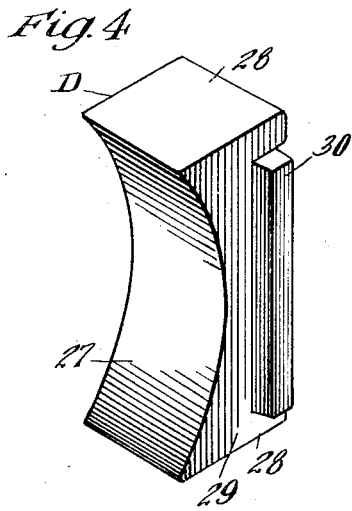
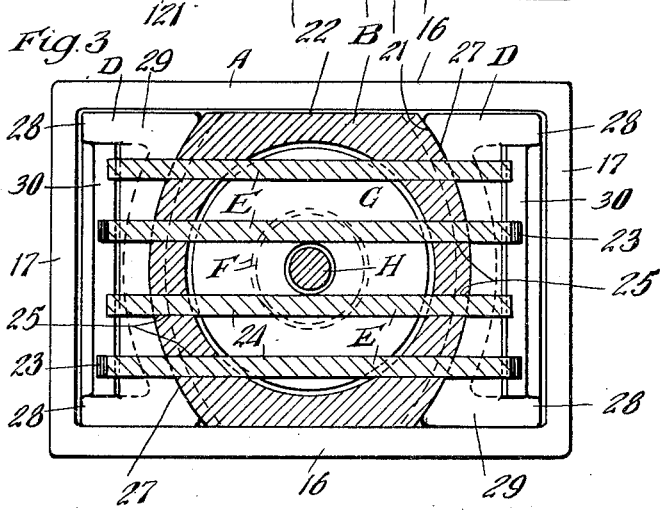
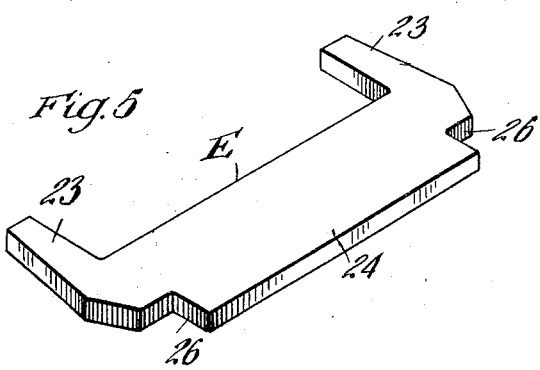
Witnesses
Wm. Geiger
Inventor
John F. O'Connor
By George D. Haight
His Atty.

Patented June 12, 1928.

1,673,371

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed January 2, 1925, Serial No. 8. Renewed February 16, 1928.

This invention relates to improvements in friction shock absorbing mechanisms.

One object of the invention is to provide a friction shock absorbing mechanism, especially adapted for railway draft riggings, wherein high capacity is obtained by a system of tandem arranged springs and friction wedge elements, together with a co-operating friction column.

Another object of the invention is to provide a friction shock absorbing mechanism of the double ended type, including a floating friction column with which cooperates a plurality of spring resisted friction shoes having wedging engagement with wedge pressure transmitting means at the opposite ends of the mechanism.

Other objects and advantages of the invention will more clearly and fully appear from the description and claims hereinafter following.

In the drawings, forming a part of this specification, Figure 1 is a horizontal, longitudinal, sectional view of a portion of a railway draft rigging, showing my improvements in connection therewith. Figures 2 and 3 are vertical, sectional views corresponding respectively to the lines 2—2 and 3—3 of Figure 1. Figure 4 is a detailed, perspective view of one of the filler blocks used in connection with my improved mechanism. And Figure 5 is a detailed perspective view of a spring compression bar.

In said drawings, 10—10 indicate channel-shaped draft or center sills of a railway car to the inner faces of which are secured front stop lugs 11—11 and rear stop lugs 12—12. The inner end portion of the drawbar is indicated at 13, to which is attached a hooded yoke 14 of well known construction, within which the shock absorbing mechanism proper is disposed. The yoke and the movable parts of the draft rigging therewithin are supported by a detachable saddle plate 15.

The shock absorbing mechanism proper comprises, broadly, front and rear follower casings A—A; a central friction column B; two pairs of friction shoes C—C; four filler blocks D—D; four spring compression bars E—E; tandem arranged spring resistance elements F—F; a pair of spring follower plates G—G; and a retainer bolt H.

The front and rear follower casings A—A are of hollow rectangular form, each having horizontal top and bottom walls 16—16, vertical side walls 17—17 and a transverse end wall 18, the whole functioning as a follower in conjunction with the corresponding stop lugs. At the end of each casing adjacent the transverse wall 18 the side walls 17 are provided with interior opposed wedge faces 19—19. Each of the end walls 18 has an inwardly projecting hollow boss 20 thereon for a purpose hereinafter described. The central friction post B is in the form of an elongated tubular member having a pair of opposed curved friction surfaces 21 at each end thereof. Each of the surfaces 21 is of true cylindrical form and the friction surface at each end of the column diverges slightly outwardly of the mechanism, as most clearly shown in Figure 1. The top and bottom sides of the column are flattened as indicated at 22, to provide faces which co-operate with the corresponding top and bottom walls 16 of the front and rear casings. As clearly shown in Figure 1, the column B is of such a length that the opposite ends thereof are spaced an appreciable distance from the corresponding end walls 18 of the follower casings when the parts are in normal full released position. As also shown in Figure 1, the inner ends of the follower casings are spaced apart a predetermined distance when the parts are in normal position, so that the inner ends of the casing will abut when the mechanism is fully compressed, thereby constituting two solid columns through which the forces are transmitted to the corresponding stop lugs.

The friction shoes, which are four in number, are of similar construction, the same being arranged in pairs, one pair co-operating with the friction surfaces 21 at the front end of the column and the other pair co-operating with the corresponding friction surfaces at the rear end of the column. Each of the shoes C is in the form of a relatively heavy block, having a wedge face 119 at the outer end thereof correspondingly inclined to one of the wedge faces 19 of the corresponding follower casing and adapted to co-operate therewith. On the inner side each shoe is provided with a cylindrical friction surface 121 adapted to co-operate with the corresponding surface 21 of the column B. As most clearly shown in Figure 1, a slight clearance is provided between the outer side of each friction shoe C and the corresponding side wall 17 of each casing so that the shoe may have slight lateral outward movement during the compression of the mechanism.

The tandem arranged spring resistance elements, each of which comprises a relatively heavy outer coil and a relatively lighter inner coil, are disposed within the hollow friction column B. The outer and inner coils of each spring resistance element bear at the outer end respectively on the end wall 18 of the corresponding casing and the inner end of the boss 20. The inner ends of the two coils of each element bear on a spring follower plate G.

The spring compressing bars E, which are four in number, are of like construction, each being in the form of a generally U-shaped member as most clearly shown in Figure 5, having arms 23 projecting at right angles to the main body portion 24 thereof. The four spring compressor bars are arranged in pairs cooperating respectively with the two spring follower plates G engaging the front and rear elements of the tandem arranged springs and the filler blocks D. The compressor bars of each pair are alternated with the bars of the remaining pair as most clearly shown in Figures 1 and 3. The central friction column is provided with four longitudinally disposed slots 25 in each side wall thereof, the slots accommodating the plates E for free sliding movement. As most clearly shown in Figure 1, the opposite ends of the plates project beyond the corresponding sides of the central column and the arms 23 of one pair extend forwardly, while the arms 23 of the outer pair extend rearwardly. As most clearly shown in Figure 5, the upper and lower ends of the main body portions 24 of the spring compressing bars E are cut away as shown at 26, the cut away portions corresponding in depth to slightly clear the side walls of the column, thereby providing sufficient clearance to assure the full maximum movement of the parts without danger of the inner ends of the compressor bars coming into contact with the filler blocks D—D.

The filler blocks D which are four in number, are all of like construction. The same are arranged in pairs at the front and rear ends of the mechanism, one pair being interposed between the shoes C at the front end of the mechanism and the outer ends of the forwardly projecting arms 23 of the one pair of spring compressor bars, and the other pair of filler blocks being interposed between the friction shoes C associated with the rear follower and the arms 23 of the remaining pair of compressing bars. Each filler block is provided with a curved inner surface 27 adapted to slide freely on the corresponding surface 21 of the friction column. At the upper and lower sides, each filler block is provided with laterally, outwardly projecting flanges 28, the outer edges of the flanges being slightly spaced from the inner surface of the adjacent side wall 17 of the corresponding follower to compensate for the taper of the central post. The flanges 28 co-operate with the side walls of the follower casings to maintain the filler blocks in properly assembled position. At the inner end each block is provided with a flat face 29 adapted to co-operate with the outer ends of the arms 23 of the corresponding bars E. Each block D also has a flange 30 at the inner end thereof overhanging the arms 23, the flanges 30 of the opposed blocks of each pair acting in conjunction to maintain the corresponding pair of bars E centered, also preventing lateral movement thereof.

The mechanism is held in assembled relation and under initial compression by the retainer bolt H having its opposite ends anchored to the bosses 20 of the front and rear follower casings and extending through the coils of the front and rear springs and alined openings in the follower plates G.

As most clearly shown in Figure 1, the parts are so proportioned and arranged that the outer ends of the friction wedge shoes are slightly spaced from the corresponding end walls 18 of the front and rear follower casings in the normal full released position of the parts so that the same may have a limited amount of outward movement to compensate for wear of the various friction and wedge surfaces.

The operation of my improved shock absorbing mechanism is as follows, assuming a buffing movement of the front follower casing A. The front follower casing will be moved rearwardly toward the rear casing, setting up a wedging action between the wedge faces of the front shoes and casing, forcing the shoes into frictional engagement with the central column. As the front follower casing and shoes move inwardly, the front pair of filler blocks and the compressing bars cooperating therewith will be carried inwardly also, compressing the rear coils of the tandem arranged springs between the rear spring follower G and the rear casing A. During the described movement of the front follower casing A, the front set of coils of the tandem springs will also be compressed between the front wall 18 of said casing and the front spring follower G, the compressing force being transmitted through the corresponding pair of compressor bars E and the interposed filler blocks D to the rear pair of friction wedge shoes. A wedging action will thus also be set up between the rear follower casing A and the shoes, forcing the latter against the corresponding friction surfaces of the column B. It will be evident that the forces tending to move the column rearwardly with the front pair of friction shoes will be substantially balanced by the forces acting to retard rearward movement of the column, due to the frictional resistance offered by the rear pair of friction shoes, and the end walls 18 of the front and rear followers will be approached by the front and rear ends of the column at substantially the same rate. Due to the tapering arrangement of the friction surfaces of the central column, a differential action will be had, the friction shoes C slipping on the corresponding wedge faces of the followers. The shoes C associated with the front follower will thus move rearwardly at a faster rate than said follower, and the rear set of shoes will move forwardly with reference to the rear follower. The compressing action will continue until relative movement of the follower casings is limited by the inner ends thereof coming into abutment, the two casings thereafter acting as a solid column to transmit the forces directly to the corresponding stop lugs, thereby preventing the springs from being driven solid.

During draft, the action is substantially the reverse of that just described, the rear follower being moved toward the front follower which is held stationary by the front stop lugs. When the actuating pressure is removed, the expansive action of the tandem arranged springs will restore all of the parts to normal position, the central column being properly centered by the shoes C cooperating with the tapered opposite ends of the column.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a pair of relatively movable followers; of tandem arranged springs co-acting with said followers; and a friction wedge system interposed between said followers, said system including a central friction member, friction wedge shoes between which said central friction member is disposed; and wedge means movable with the respective followers and co-operating with said shoes.

2. In a friction shock absorbing mechanism, the combination with a pair of relatively movable follower shells having interior wedge faces; of tandem arranged springs co-acting with said follower shells; a friction element; a plurality of friction shoes co-operating with said element, said shoes also co-operating with the wedge faces of said followers and having their movement resisted by said tandem arranged springs.

3. In a friction shock absorbing mechanism, the combination with a pair of relatively movable followers having wedge means associated therewith; of a hollow friction column interposed between said followers; friction shoes at the opposite ends of said column cooperating with said wedge means; and tandem arranged springs within said column, each of said springs cooperating with one of said followers and with the shoes associated with the other follower.

4. In a friction shock absorbing mechanism, the combination with a central friction column; of a wedge friction system cooperating with each end of said column; tandem arranged springs cooperating with said friction systems; and front and rear followers cooperating with said tandem springs, each of said followers having wedge pressure transmitting means associated therewith adapted to cooperate with the corresponding wedge friction system.

5. In a friction shock absorbing mechanism, the combination with a pair of relatively movable follower shells; of tandem arranged springs within said shells; a floating friction column; friction shoes between which said column is interposed, said friction shoes having their movement resisted by said springs; and wedge means associated with each of said shells coacting with said friction shoes.

6. In a friction shock absorbing mechanism, the combination with a pair of relatively movable casings, each having a follower acting abutment wall, each casing also having wedge means thereon; of a central friction column having outwardly converging friction surfaces at the opposite ends thereof; a set of friction shoes cooperating with the friction surfaces at each end of the column, said shoes having wedge means cooperating with the wedge means of the corresponding casing; and a spring resistance within each casing bearing on the abutment wall thereof and coacting with the set of friction shoes associated with the other casing.

7. In a friction shock absorbing mechanism, the combination with a hollow friction column; of tandem arranged springs within said column; wedge friction means cooperating with said column, said means being disposed at opposite ends of the mechanism; relatively movable followers cooperating respectively with the tandem springs, each follower having wedge means thereon cooperating with one of said wedge friction means; and pressure transmitting bars engaged by each wedge friction means, said bars extending into said column and cooperating with said tandem arranged springs.

8. In a friction shock absorbing mechanism, the combination with a hollow friction post; of friction wedge means cooperating with said post; movable wedge pressure transmitting means cooperating with said wedge means for forcing the latter longitudinally of said post; pressure transmitting means co-operating with said wedge friction means, said pressure transmitting means extending into said post; and means within the post for yieldingly resisting movement of the pressure transmitting means.

In witness that I claim the foregoing I have hereunto subscribed my name this 30th day of December, 1924.

JOHN F. O'CONNOR.